United States Patent [19]

Byckling et al.

[11] Patent Number: 4,925,261
[45] Date of Patent: May 15, 1990

[54] METHOD FOR SCANNING A LASER BEAM BY NON-MECHANICAL DEFLECTORS

[75] Inventors: Eero Byckling; Markus Kajanto, both of Espoo, Finland

[73] Assignee: Unda Oy, Espoo, Finland

[21] Appl. No.: 27,205

[22] PCT Filed: Jun. 19, 1986

[86] PCT No.: PCT/FI86/00065
§ 371 Date: Feb. 20, 1987
§ 102(e) Date: Feb. 20, 1987

[87] PCT Pub. No.: WO86/07640
PCT Pub. Date: Dec. 31, 1986

[30] Foreign Application Priority Data

Jun. 20, 1985 [FI] Finland ............... 852453

[51] Int. Cl.$^5$ .................. G02B 5/32; G02B 26/10
[52] U.S. Cl. .................. 350/3.71; 350/3.73; 350/3.75
[58] Field of Search ............ 350/3.71, 3.7, 3.73, 350/3.75

[56] References Cited

U.S. PATENT DOCUMENTS

| | | | |
|---|---|---|---|
| 4,073,566 | 2/1978 | Noguchi | 350/3.71 |
| 4,106,844 | 8/1978 | Bryngdahl et al. | 350/3.71 |
| 4,307,929 | 12/1981 | Eveleth | 350/3.71 |
| 4,547,037 | 10/1985 | Case | 350/3.75 |

Primary Examiner—Bruce Y. Arnold
Assistant Examiner—Terry S. Callaghan
Attorney, Agent, or Firm—Lowe, Price, LeBlanc, Becker & Shur

[57] ABSTRACT

A method for making an image line (10) with a laser beam, according to which
the laser beam is created by a laser (1)
the intensity of the laser beam is modulated by an external modulator or by said laser (1)
said modulated laser beam is fed into a coding element (2,3), by means of which at least one of the properties of the laser beam is transformed, e.g. amplitude, phase or direction, using an electrical control signal
the coded laser beam is fed into the hologram (9), by means of which the laser beam is transformed into focused image spots (20 ... 24a,b,c)
from said image spots (20 ... 24a,b,c) an image line (10) is formed on the image plane and
said laser beam is guided and transformed by optical elements.
According to the invention
by means of said coding element (2,3) the above mentioned characteristic of said laser beam is changed so that when changing the input signal to said coding element (2,3) a number of coded, in some sense orthogonal fields are created
said optics and said holograms (9) are designed together with the coding element so that with the aid of said hologram (9) the coded fields are separable so that each separate field forms one said image spot (20 ... 24a,b,c) on said image plane
scanning the input signal of said coding element (2,3) across its values, a number of said image spots can be formed (20 ... 24a,b,c), which form said image line (10) and
said coding element (2,3), said optics and said hologram (9) are so designed that the position error of said image spots (20 ... 24a,b,c) can be diminished by means of electronic circuits.

6 Claims, 3 Drawing Sheets

METHOD FOR SCANNING A LASER BEAM BY NON-MECHANICAL DEFLECTORS

BACKGROUND OF THE INVENTION

This invention is concerned with a method by which a large number of identical spots can be generated at great speed from a laser beam. In the method of a laser beam is deflected through perpendicular planes by means of non-mechanical laser beam deflectors, and the deflection is transformed into a one-dimensional deflection using suitable optics which contains lenses, holograms, mirrors and prisms.

Previously a number of different one-dimensional laser beam scanning methods for making spots are known. These methods contain both mechanical and non-mechanical components. A summary of the most important scanning methods is presented in an article by Leo Beiser "Laser scanning and recording: developments and trends", Laser Focus/Electro-Optics (February 1985).

In mechanical scanning methods the laser beam is deflected by a moving galvanometer mirror or a rotating polygon, and the laser beam is focused using various lenses and holograms, which are located before or after the deflecting element. A method in which moving holograms are used has also been presented. The beam may be focused by these holograms or the focusing is effected by some other elements.

In non-mechanical deflectors the beam deflection is accomplished by acousto-optic or electro-optic laser beam deflectors and the beam focusing is due to some external optical elements. A method has also been presented in which focusing is accomplished by a non-mechanical deflector (chirp-deflector, U.S. pat. No. 3,851,951).

The disadvantages of mechanical deflectors are their complicated construction and very high costs when high resolution, about 10,000 spots, is required, because the necessary mechanics has to be very precise, and the focusing optics is very complex and expensive.

The disadvantage of non-mechanical deflectors is their quite low resolution (about 1000). With the so-called chirp-deflectors one can obtain a resolution of about 10,000 but these deflectors are extremely complex and very expensive.

A non-mechanical laser beam deflector has been presented in the patent U.S. Pat. No. 4,307,929 (Eveleth). In the method presented in that patent the laser beam is deflected by acousto-optic laser been deflectors to two mutually perpendicular directions. The signal to the second deflector is quite complex, which causes the presence of many different acoustic fields simultaneously in the deflector. Moreover, each spot is created by a separate hologram. The method presented in the present patent application differs from that method both in principle and realization. In our method a number of spots are formed by one hologram or grating, and the signals in the non-mechanical deflectors are quite simple. Thus, the method is quite simple because the number of holograms and gratings is low and the resolution required of the non-mechanical deflectors is also quite low.

A characteristic of the method presented here is also the fact that no mechanically moving parts are used in it, and that especially the holograms are not moving. Previously, there has been a patent on a laser scanning method which uses non-moving holograms (U.S. pat. No. 4,073,566, Noguchi), but this method uses a rotating polygon as the laser beam deflecting element. In the patents U.S. Pat. No. 4,547,037 (Case) and U.S. Pat. No. 4,106,844 (Bryngdahl et.al.) holograms are used to create the image spots. However, the separate spots are obtained by moving the holograms, in contrast to the present method.

Part of the invention concerns a method to eliminate the placement error of the spots. In many earlier patents there have been discussions on eliminating the placement error perpendicular to the line formed by the spots, but the present method greatly differs from these earlier patents. Firstly, the method presented here is non-mechanical, in contrast to many other patents. Secondly, our method has the characteristics that in the direction in which the error is to be eliminated, it can be done at all the deflection angle values of the non-mechanical deflector, in contrast to the other patents, in which one wants to keep the direction consistant.

In the known patents and constructions, a high resolution, inexpensive non-mechanical laser beam deflector has not been presented. The limiting factors have been the inadequate resolution of non-mechanical deflectors or the unreasonably complex structure of the systems.

SUMMARY OF THE INVENTION

The origin of the present method is the following new idea. In ordinary laser beam scanning methods two operations are performed simultaneously on the laser beam: creating mutually (in some sense) orthogonal laser beams which produce the focused spots, and on the other hand, directing these beams into the desired directions, i.e. the deflection. If we now could have the two operations carried out by separate components, both subsystems can be designed to be appropriate to a specific one of the operations. Thus, we can obtain better performance by essentially simpler components. Especially, constructing a high resolution non-mechanical deflector becomes possible.

The general idea can also be presented as follows: first the laser beam is coded in a specific coding element so as to include the information which specifies which one of the N orthogonal field is specified. Using another specific component these N beams are then transformed into N focused laser beam spots in the desired positions on the image line. Both the coding of the beam and the transforming of the beams into focused spots can be carried out using many different types of components. Suitable coding elements are e.g. spatial light modulators. The transformation of the beams can be accomplished e.g. by means of holograms.

In the following we shall present a construction which is quite inexpensive when state of the art components are used. The coding element is formed by two acousto-optic light deflectors deflecting in two perpendicular directions. The transformation of the beams is performed in the subsystem formed by gratings and holograms. In the whole system the beam is formatted in one direction in a certain way and in the other direction in another way, so that the combined effect is the one desired. The beam thus formatted propagates through conventional optical elements and holograms. The information about how the different image spots are produced is encoded into the holograms, and the different spots are obtained by driving the deflectors suitably. The holograms can be e.g. computer-generated holograms (CGH), whereby in principle we can obtain any arbitrarily given hologram which has the property that it transforms the given wave to the desired one.

The requirements of the accuracy of the laser beam are in many applications very high. In many applications the error of the placement of the laser beam can be only a fraction of the diameter of the beam. In our method the accuracy is based on the fact that small errors in the coding element (e.g. in the acousto-optic deflector) do not affect the position of the spot. One method to accomplish this is to image the aperture of the coding element by suitable optics on the image plane. In that case, according to the known laws of optics, the direction of the beam emerging from the aperture does not affect the place of the image spot. Because in some constructions this kind of imaging may result in rather complicated optics, the special imaging may also be performed only in one direction, which is perpendicular to the image line. In the other direction the errors are corrected by electronics.

The invention described in the patent claims is a method by means of which inexpensive, accurate and reliable high resolution laser beam deflectors can be constructed, using mechanically not moving laser beam deflectors.

DESCRIPTION OF THE PREFERED EMBODIMENT

Figure 1:
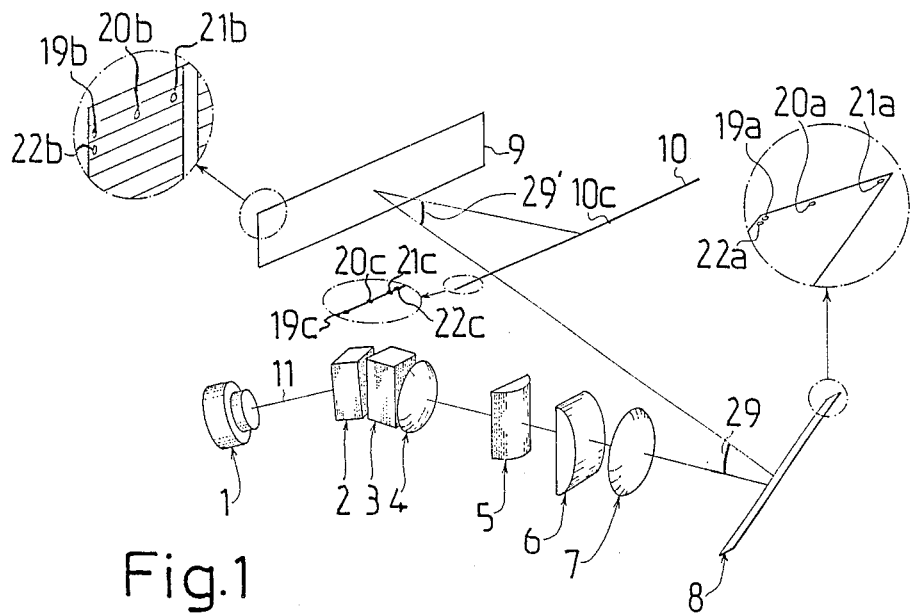
FIG. 1. One realization of the laser beam scanning method.

One possible way of realizing the scanning method is presented in FIG. 1. In this case the non-mechanical deflectors are acousto-optic laser beam deflectors.

We have designated with number (1) the laser and the optics which transform the beam emerging from the laser. Numbers (2) and (3) refer to acousto-optic deflectors, (4), (5), (6), and (7) are lenses, among which (5) and (6) are cylindrical lenses and (7) is an ordinary spherical lens, (8) is a grating formed by several subgratings, (9) is a hologram formed by several subholograms, (10) is the image line formed by the spots and (11) is the optical axis of the system.

In the configuration of FIG. 1 the acousto-optic deflector (2) operated in random access mode and the acousto-optic deflector (3) operates in the continuously sweeping mode. The operation of the scanner is as follows. The total image line is drawn a section at a time. The spots in one section of the image line are drawn by scanning the acousto-optic deflector (3) over its total deflection range. The optical wave which produces the image spots is created when the collimated laser beam hits the focusing element. Different spots will be obtained by changing the incoming angle of the beam on the hologram, and this change is accomplished by the acousto-optic deflector (3). Another section of the image line is drawn by changing the deflection angle of the acousto-optic deflector (2), so that the ray hits a different focusing hologram. Adjacent sections of the image line are drawn by adjacent values of the deflection angle and the focusing elements are so situated that the parts of the image line smoothly join each other. In the direction of the deflection of the acousto-optic deflector (2) the position error of the beam can be eliminated. This error is actually eliminated if the final image spot is a suitable scaled image of some part of the laser beam which does not move in this direction. In this case the appropriate non-moving position is the aperture of the deflector (2). Finally, the laser beam is modulated e.g. by some non-mechanical laser beam modulator or, if a semiconductor laser is used, by modulating the input current to the laser.

Let us now discuss the scanner in more detail. Let us assume that the beam from the deflector has an approximately Gaussian distribution.

Figure 2:
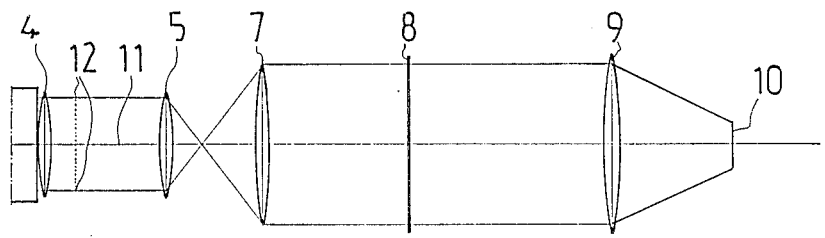
FIG. 2. Propagation of the ray through the system of FIG. 1 in the plane of the image line (10).

FIG. 2 illustrates the path of the beam in the direction of the deflection of the acousto-optic deflector (3), which in this case is in the plane of the image line. Lines (12) represent the diameter of the beam in this direction. There dimensions of the various components in the figure are chosen for the purpose of efficient illustration and are not the correct relative dimensions.

Holograms and gratings can operate either in reflection mode or in transmission mode. In FIG. 1 they are depicted in the reflection mode, but in FIGS. 2 and 3 they are, for simplicity, shown in the transmission mode.

Figure 3:
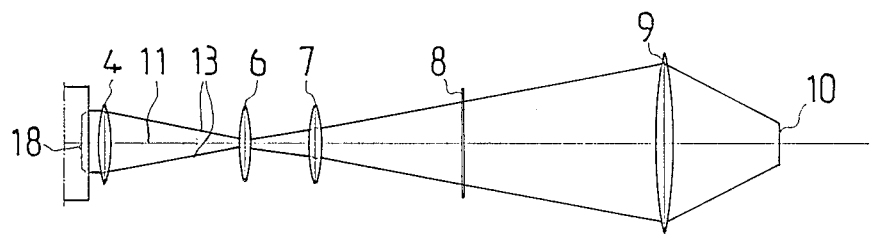
FIG. 3. Propagation of the ray through the system of FIG. 1 in the plane perpendicular of the image line (10).

In a similar way, FIG. 3 illustrates the propagation of the beam in the direction perpendicular to the image line, i.e. in the direction in which the acousto-optic deflector (2) deflects. The lines (13) represent the diameter of the beam in this direction. The figure is again not drawn to correct scale.

Let us first study the propagation of the beam in the plane which contains the image line. In FIG. 2 we see the diverging beam (12) emerging from the acousto-optic deflectors (2) and (3), of which (3) is effective in this direction. Its divergence is caused by choosing the direction of the scanning signal suitably. This beam hits a lens (4), which removes the divergence. After this the beam is a plane wave, and this plane wave hits a telescope, formed by the lenses (5) and (7). The telescope causes the beam to become wider in this direction and the deflection angle to become smaller. Emerging from the telescope, the beam propagates through the grating (8) to the hologram (9), which focuses the beam into an image spot, e.g. (10c), on the image line (10).

Let us next study the propagation of the beam in the plane perpendicular to the image line. From FIG. 3 we see that the beam emerging from the deflectors (2) and (3), of which (2) is effective in this direction, hits the focusing lens (4). This converging beam then propagates to the focusing lens (6) and (7). The function of the lens (7) can be separated into two parts. One part, together with lenses (4) and (6), amounts to a telescope. The input and output pupils of this telescope are on the lenses (4) and (7), respectively. The other parts focuses the beam so obtained to the plane of the holograms. Hence it forms the Fourier transform of the beam on the plane of the holograms. There is thus a focusing component in the lens (7). The focal length of this focusing component is chosen to be the distance between the lens (7) and hologram (9).

The goal is to obtain a very narrow beam in the direction perpendicular to the image line. When the beam is focused, the focus will be located very close to the lens and the beam starts to diverge after that. Thus the beam, after the lens (7), is very soon a diverging cylindrical wave. This cylindrical wave hits first the grating (8) and then the hologram (9). The operation of the hologram (9) can again be understood as being composed of two separate functions. There is a component which removes the cylindrical phase from the wave. Secondly, there is in addition a beam focusing component. In the direction under discussion we obtain on the image line (10) an image of the aperture (18). Hence, small errors on the deflection angle of the acousto-optic deflector (2) do not affect the position of the beam in this direction.

The parameters of the scanner are so chosen that the intensity profile of the beam in the direction of the image line and in the direction perpendicular to this direction, are approximately the same. Hence, when the beam is focused, the final spot has an approximately symmetrical intensity profile.

Figure 4:
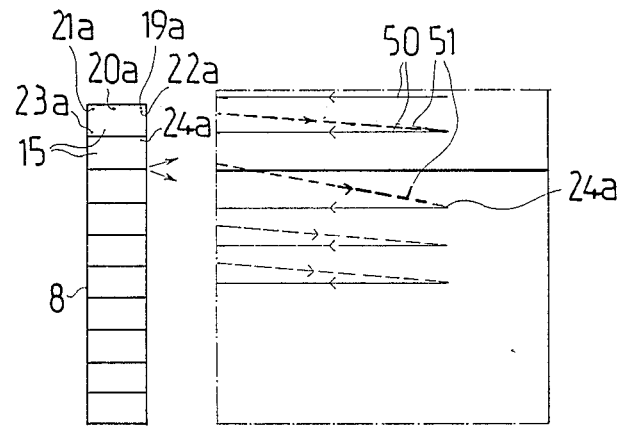
FIG. 4. The structure of the grating (8).
Figure 5:
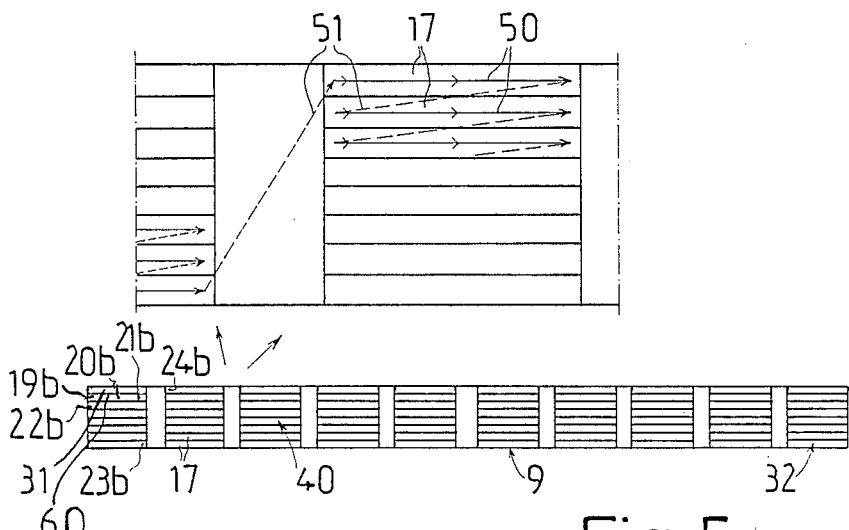
FIG. 5. The structure of the hologram (9).

Let us next discuss the functioning of the deflector when drawing the total long image line. Let us first present the structure of the holograms and gratings. The grating (8) (FIG. 4) consists of several subgratings. These subgratings are e.g. (15). Each subgrating is an ordinary constant period grating. The hologram (9) FIG. 5) is consists of several long subholograms, e.g. (60) and (17). Before starting to draw the image line the deflection angles are monitored. In the beginning the deflection angle of the acousto-optic deflector (2) is at its lowest value. The deflection angle of the acousto-optic deflector (3) is at its rightmost value. Then the beam hits the subhologram (31), by which the deflection angles can be checked, in the way explained later. After this measurement the vertical deflection angle is changed a little and the horizontal defection starts again from the rightmost value. The beam hits now the grating at the point (19a) and the hologram at the point (19b) and the image line at the point (19c). These points are indicated in the FIGS. 1, 4, and 5. By changing the deflection angle of the acousto-optic deflector (3) continuously, we reach the points (20a,b,c) after a time. Because the deflection angle of the deflector (3) changes continuously and smoothly and the hologram (9) has a focusing lens effect, we obtain the image spots equidistant on the image line, and there is no error in their vertical position; cf. the previous discussion. When the deflection angle of the acousto-optic deflector (3) reaches its leftmost value, the spot is at the point (21a,b,c). After this we change the vertical deflection angle a little and begin the horizontal deflection again, whereby we reach the point (22a,b,c). Continuing similarly we can draw the whole image line.

After drawing a number of sections of the image line we reach the point (23a,b,c). Then we change the vertical deflection angle twice as much as previously, and reach then, when the horizontal deflection starts from the starting value, the point (24a,b,c). The deflection angle is here changed twice as much, because when we move from one subgrating to another, the small direction errors in the deflection angle of the deflector (2) must guarantee that the beam hits the subgrating even in this case without spilling over. We can then draw the whole image line in parts, the length of each section being the distance between (22c) and (19c). While the spot is on the line depicted in FIGS. 4 and 5 by a continuous line the beam is generally on, apart if it is turned off by the image modulation signal, while on the portion depicted with a dashed line in the FIGS. the beam is always off. The arrows indicate the directions of deflection.

Figure 6:
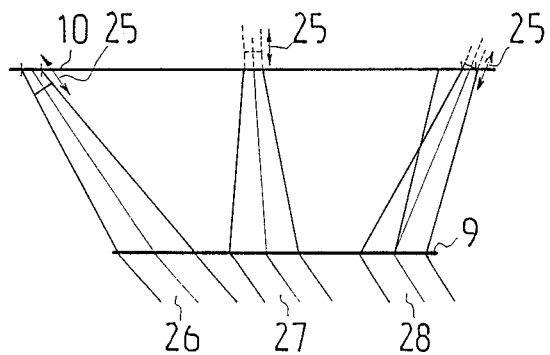
FIG. 6. The propagation of the beam from one subhologram to the image line in the plane of the image line (10).

In order to obtain accurately homogeneous diffraction efficiency for the gratings and the holograms, the line spacing has to be quite homogeneous. This can be achieved by choosing the positions of the subholograms suitably, if we require at the same time that the depth of focus is not exceeded and the subholograms have the normal focusing characteristics. This is illustrated in FIG. 6, which is drawn to depict the direction in which the acousto-optic deflector (3) is effective. The depth of focus is (25), and (26–28) are three rays hitting the hologram at different angles. The homogeneity of the line spacing can be enhanced by deflecting the optical axis of the system by suitable angles (29) and 29') (FIG. 1), which are preferably of equal value. The phase function of the subholograms can be represented in the form $$\phi_{i,j} = \frac{2\pi}{\lambda}\left[x\sin\theta_h + \left(\frac{y^2}{2f_F} + y\sin\theta_v\right) + \sqrt{(h_x - x)^2 + (h_y - y)^2 + f^2} - f\right].$$

The origin of the coordinate system x,y is the center point of the subhologram i, and $h_x$ and $h_y$ are the center point coordinates of the line section drawn by the i:th subhologram, $f_F$ is the focal length of the Fourier transforming part of the lens (7) and f is the focusing focal length of the hologram and i indexes the subholograms.

The phase function of the subholograms can be optimized suitably, the positions of the subholograms can be chosen rather freely, and there is not much problemt to maintain staying inside the focus. In the optimization a polynomial is added to the phase function and the coefficients of this polynomial are evaluated by means of a suitable optimization algorithm used in ray-tracing optimization.

Figure 7:
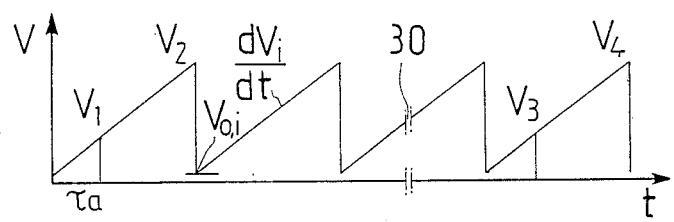
FIG. 7. The input signal to the deflector (2) as a function of time, presented schematically.
Figure 8:
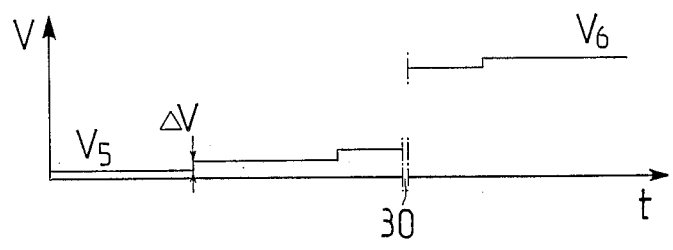
FIG. 8. The input signal to the deflector (3) as a function of time, presented schematically.
Figure 9:
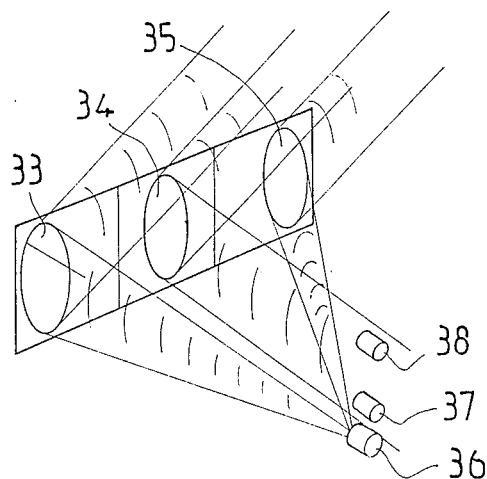
FIG. 9. Measurement of the deflection angles of the beam.

FIGS. 7 and 8 illustrate the input signals to the acousto-optic deflectors. The figures are not drawn to scale. The input signal to the acousto-optic deflector (2) is in FIG. 8 and the input signal to the acousto-optic deflector (3) is in FIG. 7. The label (30) represents the portions of the image line not drawn in the figure. FIG. 9 illustrates how to monitor the deflection angles of the acousto-optic deflectors. In this construction the first and the last subholograms are in three parts. Drawing the image line begins at the second subhologram and ends at the one before the last subhologram. In carrying out this measurement, the deflection angle changes in the same way as when one draws normally the image lines. Using the sections (33) and (35) the horizontal deflection is measured and using the section (34) the vertical deflection is measured. The parts (33) and (35) focus the beam, similarly as when the image spot is produced. The focused spot hits the deflector (36). By means of the detector we can get the exact relationship input signal vs. deflection angle. Checking the vertical deflection angle is slightly more complicated, because focusing the beam removes the small errors of the deflection angle of the deflector (2). Checking can be made e.g. by removing the cylindrical wave component of the part (34) and directing the plane wave to two detectors (37) and (38). When these detectors are suitably positioned, the difference of the detected signal indicates the deflection angle. The whole monitoring can be accomplished using a part of the subhologram and the remainder can be used to draw spots.

Before starting to draw the image line we obtain the voltages $V_1$ and $V_2$, which correspond to the smallest and the largest deflection angles of the acousto-optic deflector (3) at the start of sweep. We also obtain $V_5$, which corresponds to the smallest deflection angle of the acousto-optic deflector (2). At the end of the sweep we obtain the voltages $V_3$ and $V_4$, which correspond to the smallest and the largest deflection angles of the acousto-optic deflector (3) at the end. We also get the $V_6$, which corresponds to the largest deflection angle of the acousto-optic deflector (2). From these it is easy to calculate the starting point of the input signal $V_{0,i}$ and the growth rate $dV_i/dt$, for each subhologram separately, where i indexes the subholograms. We also get the step size $\Delta V$ for the acousto-optic deflector (2). With this feedback we can eliminate the errors in the deflection electronics and the errors in the positions in the spots.

The laser scanner described above can be realized using e.g. the following values of the parameters.

| | |
|---|---|
| Rate of scanning the image spots | 8 MHz |
| Image line length | 420.448 mm |
| Resolution | 600 $\frac{lines}{inch}$ |
| Number of image spots | 9932 |
| Laser | |
| Type | semiconductor laser |
| Mode | TEM-00 |
| Wavelength | 780 nm |
| Cross section of the beam | ellipse |
| Size of the beam | 2.5 mm × 1.86 mm |
| Acousto-optic deflector 2 | |
| Material | TeO$_2$ |
| Acoustic bandwidth $\Delta f$ | 41.5 MHz |
| Time aperture $\tau$ | 4.44 μs |
| $\tau\Delta f$ | 184 |
| Aperture | 2.75 × 2.75 mm$^2$ |
| Static 1/e$^2$ resolution | 98 |
| Acousto-optic deflector 3 | |
| Material | TeO$_2$ |
| Acoustic bandwidth $\Delta f$ | 41.5 MHz |
| Time aperture $\tau$ | 4.44 μs |
| $\tau\Delta f$ | 184 |
| Aperture | 2.75 × 2.75 mm$^2$ |
| Dynamic ½ resolution | 128 |
| Scanning rate | 62.5 kHz |
| Time efficiency | 72% |

| Parameters of the lenses 4, 5, 6 and 7 | | | | |
|---|---|---|---|---|
| | lens no 4 | lens no 5 | lens no 6 | lens no 7 |
| Type | spherical | cylindrical | cylindrical | spherical |
| Focal length | 19.0 cm | 1.67 cm | 2.21 cm | 2.43 cm |
| f# | 76 | 6.7 | ~200 | 6.7 |

Focal length of the Fourier transforming parts in the lens 7 is 90 cm

| Parameters of the grating | |
|---|---|
| Size | 1.67 cm × 8.7 cm |
| Size of the subgrating | 1.67 cm × 0.87 cm |
| Line spacing | 2.2–3.0 μm |
| Type | Sawtooth |
| Parameters of the holograms | |
| Size | 41.0 cm × 3.2 cm |
| Size of the subhologram | 3.41 cm × 0.40 cm |
| Line spacing | ~2–~3 μm |
| Type | sawtooth |
| Focal length | 21.0 cm |
| Focal length of the cylindrical part | 90.0 cm |

Figure 10:
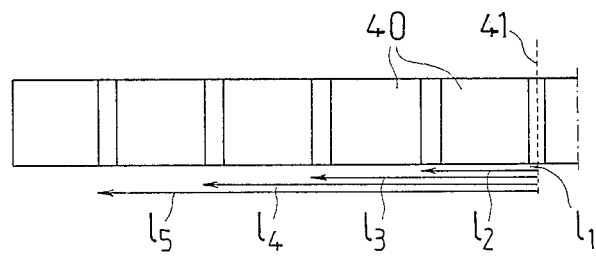
FIG. 10. The positions of the subholograms as calculated from the values of the parameters presented as an example.

FIG. 10 illustrates the positions of the subhologram groups (40) presented in FIG. The positions are relative to the symmetry axis (41) of the hologram (9). The distances are: $l_1=0.6$ cm, $l_2=4.7$ cm, $l_3=8.9$ cm, $l_4=13.0$ cm, $l_5=17.1$ cm.

In the system described above the number of the subholograms is 80. With one subhologram we can draw 128 image spots. The total number of image spots may then be 10240. Because the first and the last subholograms are used to check the deflection angles, the total number of spots which can be drawn is 9984. Hence all of the 9932 image spots can be drawn and in addition 52 points are in reserve.

The gratings and the holograms can be fabricated e.g. by electron beam etching. They can easily be copied by embossing or they can be made interferometrically. For the non-mechanical deflector elements we can use PbMoO$_4$crystal. In this case we have to build certain optics around these defectors, or we can use a single crystal deflecting the light beam in both directions. Also, all of the subholograms need not be in the same plane. They can be on a curved surface so that in the case of reflection holograms, near the edges on the image line the subholograms may be closer to the image line. Hence, the distance from the grating to subholograms is the same for almost all of the subgratings, and in this case the optimization is also simpler. Checking the deflection angles can also be carried out at the edges of the subholograms. Hence we can draw the image line using only the center part of this kind of subhologram. Monitoring can also happen more than twice.

The method is not restricted to the described construction only. The scanner may alsobe made such that the beam first hits the focusing hologram and then from the hologram the beam propagates to several separate gratings which direct the beam to the image line. In the system there can also be several holograms, and the combined effect of these holograms and the rest of optics will be the desired spots. The focusing of the beam can also be accomplished by separate lenses, the holograms being used only to direct the focused beam to the desired image spots. The acousto-optic deflectors can be tilted with respect to the direction of the image line, the combined effect of these deflectors being the desired effect.

In the elimination of the errors in the vertical direction it is essential that we obtain a diverging cylindrical wave. The divergence point of this cylindrical wave does not depend on the vertical deflection angle. The method described above is only one way to obtain this effect. We could e.g. use a broader laser beam which is focused. In this case the distance between the focusing element and the subhologram is greater than the divergence radius of the cylindrical wave, and the focal length is not equal to their distance. The diverging cylindrical wave can also be made using diverging lenses.

What we claim is:

1. A method for making an image line with a laser beam, wherein the laser beaim is created by a laser, the intensity of the laser beam is modulated by an external modulator or by said laser, said modulated laser beam is directed onto a coding element by means of which the amplitude, phase or direction of the laser beam is transformed using an electrical control signal, the coded laser beam being directed onto a rectangular hologram at a deflection angle determined by said coding element by means of which the laser beam is transformed into focused image spots, and an image line is formed from said image spots on the image plane and wherein said laser beam is guided and transformed by optical elements, the method comprising the steps of:

providing two non-mechanical laser beam deflectors, one for vertical deflection and one for horizontal deflection, to form said coding element;

transforming and directing said laser beam by means of a lens and at least one grating, mirror or prism;

scanning through the deflection angle in a continuous manner in the direction of the image line and in a stepwise manner in a predetermined direction that is perpendicular to the direction of the image line; and feeding the coded laser beam into said hologram which is comprised of a plurality of subholograms, each subhologram being capable of forming more than one said image spot so that different image spots are obtained by changing the incoming angle of the beam in the direction of the image line.

2. A method as claimed in claim 1 wherein said two non-mechanical deflectors are acusto-optic deflectors or electro-optic deflectors.

3. A method as claimed in claim 1 further comprising the further step of: changing the direction of said laser beam using an element which includes several subelements, so designed that every subelement directs a beam which hits it at a given vertical deflection angle to a given subhologram and the beam is caused to hit the different said subholograms by changing the vertical deflection angle with a grating, a mirror or a prism.

4. A method as claimed in claim 1, comprising the further step of:

measuring said deflection angles of said non-mechanical deflectors at least once during the generation of one said image line, the measurement being carried out by directing the beam by means of subholograms or parts of subholograms to photodetectors whereby said deflection angles in the direction of said image line and in the direction perpendicular thereto are measured, whereby position errors can be defined and diminished.

5. A method as claimed in claim 1, further comprising the further step of: designing said coding element, said optics and said hologram so that said image spot is, in the direction perpendicular to said image line, an image of a non-moving part of the laser beam, whereby the non moving part experiences two consecutive Fourier transformations and whereby in this direction the error of the position of said image spot is minimized.

6. A method as claimed in claim 3 or 5, wherein:

said laser beam upon reaching the subholograms is collimated in a first plane in the direction of said image line and, in a second direction perpendicular thereto said laser beam is formed into a diverging cylindrical wave, and the location of a focal point of said diverging cylindrical wave is independent of said vertical deflection angle, whereby the error in the direction in which the divergence takes place becomes smaller when said laser beam is focused.

* * * * *